M. W. SMITH & E. J. RICHEY.
Grain-Drill.

No. 210,973. Patented Dec. 17, 1878.

WITNESSES

INVENTORS,
M. W. Smith
E. J. Richey
By Henry J. Ennis
ATTORNEY

UNITED STATES PATENT OFFICE.

MILTON W. SMITH AND ELI J. RICHEY, OF SCOTTSBURG, INDIANA.

IMPROVEMENT IN GRAIN-DRILLS.

Specification forming part of Letters Patent No. 210,973, dated December 17, 1878; application filed November 11, 1878.

*To all whom it may concern:*

Be it known that we, MILTON W. SMITH and ELI J. RICHEY, of Scottsburg, in the county of Scott and State of Indiana, have invented certain new and useful Improvements in Grain-Drills; and we do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
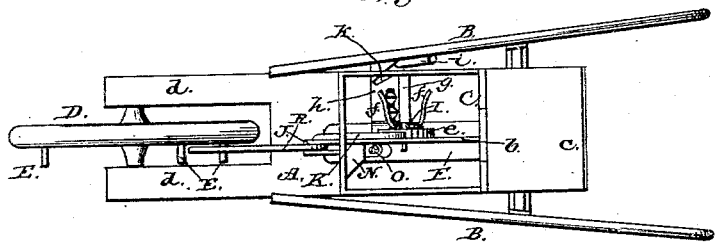
Figure 2:
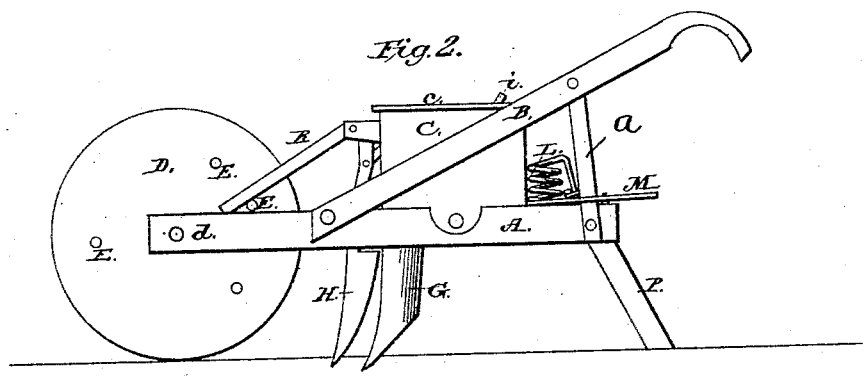
Figure 3:
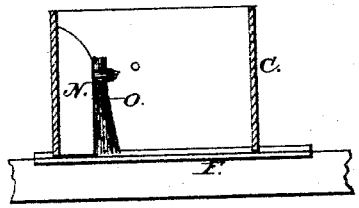
Figure 4:
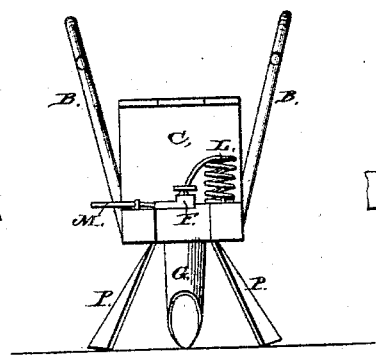
Figure 5:
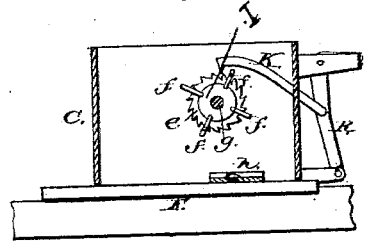

Figure 1 is a plan view of a seed-planter embodying the improvements in our invention, the lid of the hopper being open to show the internal mechanism. Fig. 2 is a side elevation of the same. Fig. 3 is a vertical longitudinal sectional view taken through the left-hand hopper. Fig. 4 is a rear elevation, and Fig. 5 is a vertical longitudinal sectional view through the right-hand hopper.

This invention has relation to seed-planters; and consists in the improvements in the construction of the same, hereinafter fully described, and particularly pointed out in the claims.

In the accompanying drawings similar letters of reference indicate corresponding parts in the several figures.

A represents the frame of the machine, and B the handles, supported by braces $a$, rising therefrom. C is the hopper, having the partition $b$ and a lid, $c$. At the forward end of the frame A, and mounted in bearings in the side beams, $d\ d$, thereof, is the drive-wheel or operating-wheel D. On one face of the wheel D pins E are inserted at equal distances apart, to cause the seed to be dropped at the required distance apart by co-operative mechanism, to be hereinafter described. The pins E are removably secured within the face of the wheel D, so that the distances between the points of depositing the seed can be varied.

The hopper C is provided with a seed-slide, F, which operates beneath the partition $b$, and which is perforated on both sides of said partition, to carry the seed to the discharge-spout G. A cutter, H, is placed before the discharge-spout and in rear of the drive-wheel to open the ground. The right-hand portion of the hopper C is provided with an agitator, I, composed of a ratchet-wheel, $e$, having arms $f$, mounted on a shaft, $g$, traversing said section of the hopper. This portion of the hopper has a cut-off, $h$, operated by a lever, $i$, working in a diagonal slot, $k$, to either cut off the flow of seed from this section of the hopper or to permit it to flow, when desired. A hook-shaped lever, pivoted in a bifurcated arm, J, extending from the front of the hopper C, has a detent, K, extending rearward from the lower arm of the hook-shaped lever R, through the front of the hopper C, and engaging with the ratchet-wheel $e$, which is operated by the pins E to draw the seed-slide F forward. A spiral spring, L, at the rear of the hopper C, retracts the slide F when it is in operation.

An eccentric-lever, M, is located at the rear of the hopper C, and is employed to force the seed-slide forward to elevate the long arm of the hook-shaped lever, in order that the pins E may not operate it.

A block, N, in the right-hand front corner of the left-hand portion of the hopper C, is bolted thereto, and carries a brush, O, to cut off the surplus seed.

From the rear end of the frame A two coverers or hoes, P, descend, and are employed to cover the seed after it is dropped.

The side of the hopper provided with the agitator is used to plant cotton-seed, although other kinds of seed may be planted by it. The other side is adapted for planting corn, cane-seed, and the like. In the cotton-planting side the cut-off may be operated to make it inactive while the other side is used.

Having thus described our invention, what we claim as new and useful, and desire to secure by Letters Patent of the United States, is—

1. The double seed-slide F, working beneath the central partition, $b$, in the bottom of both hoppers, for dropping seed and fertilizers simultaneously, in combination with an agitator, I, operated by a pawl or arm extending from the lever R, and spring J, for imparting to the agitator an intermittent rotary motion, substantially as set forth.

2. In a seed-planter, the V-shaped operating-wheel D, provided with pins E, the lever R, for giving motion to the agitator I, and double seed-slide F, in combination with the locking-arm M, for holding the lever R out of contact with the pins E in the operating-wheel D, constructed and operating substantially as and for the purpose set forth.

In testimony that we claim the foregoing as our own we hereby affix our signatures in presence of two witnesses.

MILTON W. SMITH.
     ELI J. RICHEY.

Witnesses:
 JOEL H. GRAY,
 SYLVANUS LEWIS.